J. P. DICKSON.
Car Brake and Starter..

No. 214,116. Patented April 8, 1879.

Witnesses,
A. A. Marvin
F. A. Alexander

Inventor,
John P. Dickson,
per Atty A. S. Waterhouse,

UNITED STATES PATENT OFFICE.

JOHN P. DICKSON, OF SACRAMENTO, CALIFORNIA.

IMPROVEMENT IN CAR BRAKE AND STARTER.

Specification forming part of Letters Patent No. 214,116, dated April 8, 1879; application filed October 1, 1878.

*To all whom it may concern:*

Be it known that I, JOHN P. DICKSON, of the city and county of Sacramento, State of California, have invented a new and useful Improvement in Brake and Starter, of which the following is a specification.

The invention consists in providing a car with a device to catch and hold its momentum when wishing to stop, and using it again to start with.

The device consists in the combination of a ratchet and band wheel fixed on the axle or shaft; also, a spring, ratchet-hook, and hug-band, working in conjunction for the above purpose, and as set forth in the caveat filed by me in the Patent Office in the years 1874, 1875, 1876, and 1877.

Figure 1:
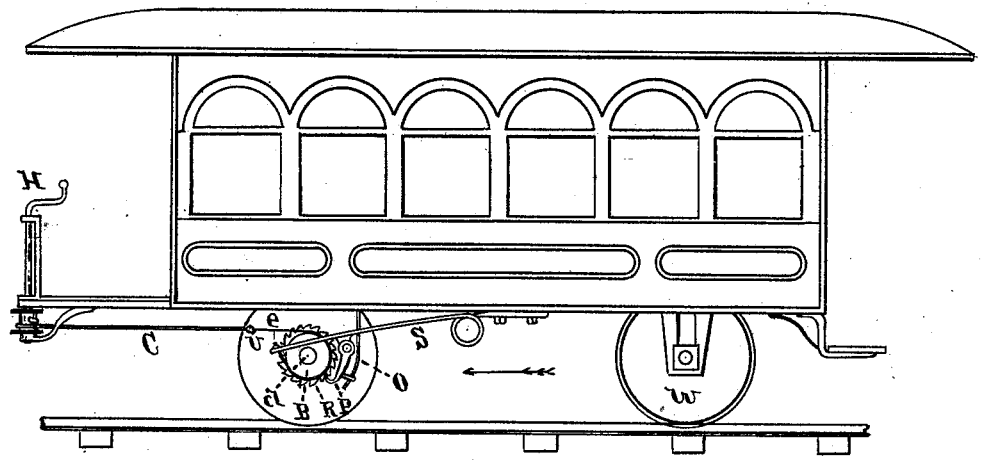
Figure 2:
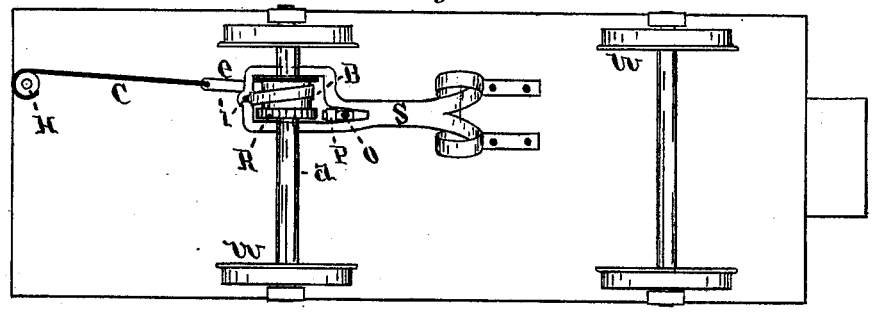
Figure 3:
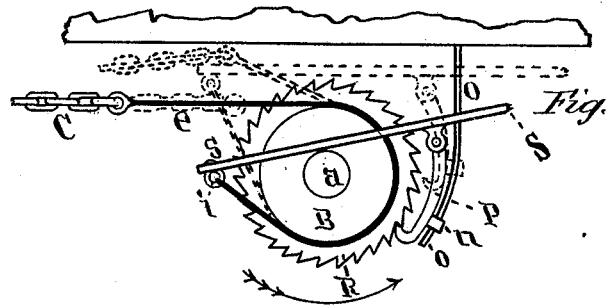

Referring to the accompanying drawings, Figure 1 shows an elevation of a car with the device embodying my invention. Fig. 2 shows an inverted plan of the same. Fig. 3 is a detail.

Fig. 1 shows a device connected to the forward axle of a street-car, the motion of which is shown by the arrows. The rotation of the wheel $w$ and the axle upon which the device is attached is also shown by the arrows.

The brake-arm H winds or unwinds the chain C, which is attached to the band $e$, said band running from C over and around the said band-wheel B, thence up, and is connected to the spring S, so that as the band $e$ is tightened by the rotation of the arm H the rotation of wheel B assists in drawing the band $e$ around in the direction shown by the arrow, enabling the band to be wound up by arm H easily, as it has the rotative power of wheel B in its favor, to wind the band up, as shown, so that the spring is drawn down on the axle $a$, which acts as a fulcrum and prevents it from going any farther, so that the band $e$ can then be tightened by arm H, and the car stopped by the hug-band $e$ preventing wheel B from rotating.

In practice, the spring S will be made strong enough, so that it will be sufficiently rigid to stop the motion of the car or axle before the spring is forced down as far as the axle $a$.

The ratchet-hook P, which is connected to the spring S, catches in the ratchet-wheel R, as shown, so that when the brake-arm H is let loose the band $e$ is released from the wheel B, leaving it free to rotate, while at the same time the spring S springs back to its former position, which is close to the bed of the car, causing the wheel B to turn by means of the hook P, which catches in the notches of ratchet R, so that as the spring moves up the hook P moves with it, and carries the hook side of ratchet-wheel R upward and around, and thus starts the car ahead. While the spring is up it also acts to support the band $e$ and chain C, as shown in dotted lines, (see Fig. 3,) and thus keep the band $e$ from contact with wheel B.

Fig. 2 shows an inverted plan of the car, or a view of its bottom side, showing the ratchet-wheel R and the band-wheel B both attached to the axle $a$, the spring S rigidly connected to the car-bottom, and provided with an opening at its end that will reach around the wheels B and R, as shown.

The band $e$ is fastened to the spring, said band running spirally around and over wheel B, thence forward to where it is connected to the chain that leads to the hand-brake H.

Fig. 3 shows a sectional detail of the device embodying my invention, showing the band-wheel B and ratchet-wheel R, both on the axle $a$, the band $e$ drawn tight, with the spring S drawn down on the axle $a$, which re-enforces the spring and causes it to act as a lever, so that the band $e$ can be tightened and the wheel B stopped by the friction or hug of the band $e$. While the spring S is in this position, or near to the axle $a$, the ratchet-hook P engages in the ratchet-wheel R, as shown, so that when the band $e$ is loosened the spring S flies up, as shown by dot-lines, and causes the hook P to draw upward on the ratchet-wheel R and revolve it in the direction shown by the arrows.

The hook P is guided by means of a spring-rod, O, which is fastened to the bottom of the car, and passes through a clip, $n$, made a part of the hook P, so that when the hook is forced down, as shown, the rod O springs the hook P into the ratchet-wheel R, and when the hook P is carried up by the spring, as shown by the dot-lines, the rod O holds the hook away from ratchet R, so that the wheel is free to rotate.

What I claim as new is—

The band-wheel B and ratchet-wheel R, in combination with the spring S, or its equivalent, provided with the hook P, rod O, band e, and brake-arm H, so arranged that by tightening the band e it will cause the momentum of the car to force the spring S down, and when the band e is left slack the spring S will fly back, and, by means of the hook P engaging in the ratchet-wheel R, cause the car to start forward, substantially as and for the purposes set forth.

JOHN P. DICKSON.

Witnesses:
H. A. MARVIN,
F. A. ALEXANDER.